United States Patent [19]

Klausner et al.

[11] Patent Number: 5,390,236

[45] Date of Patent: Feb. 14, 1995

[54] TELEPHONE ANSWERING DEVICE LINKING DISPLAYED DATA WITH RECORDED AUDIO MESSAGE

[75] Inventors: Judah Klausner, Sagaponack, N.Y.; Robert Hotto, La Jolla, Calif.

[73] Assignee: Klausner Patent Technologies, Sagaponack, N.Y.

[21] Appl. No.: 881,949

[22] Filed: May 12, 1992

Related U.S. Application Data

[63] Continuation-in-part of Ser. No. 860,699, Mar. 31, 1992, Pat. No. 5,283,818.

[51] Int. Cl.6 .................... H04M 1/64; H04M 11/00
[52] U.S. Cl. ..................... 379/67; 379/88; 379/76; 379/77; 379/96; 379/97; 379/104; 379/354; 379/357
[58] Field of Search ............ 379/67, 88, 89, 70, 379/74, 77, 76, 96, 97, 142, 199, 357, 354, 104, 105, 106

[56] References Cited

U.S. PATENT DOCUMENTS

| | | | |
|---|---|---|---|
| D. 299,716 | 2/1989 | Weisz et al. | D14/141 |
| D. 316,024 | 4/1991 | Sharbaugh | D14/151 |
| D. 327,063 | 6/1992 | Panzer | D14/141 |
| 4,241,238 | 12/1980 | Strand | 179/5.5 |
| 4,304,968 | 12/1981 | Klausner et al. | 379/70 |
| 4,477,807 | 10/1984 | Nakajima et al. | 340/825.44 |
| 4,511,764 | 4/1985 | Nakayama et al. | |
| 4,517,410 | 5/1985 | Williams et al. | |
| 4,600,809 | 6/1986 | Tatsumi et al. | |
| 4,612,416 | 9/1986 | Emerson et al. | 179/6.11 |
| 4,759,056 | 7/1988 | Akiyama | 379/197 |
| 4,776,002 | 10/1988 | Kammerl | 379/88 |
| 4,782,510 | 11/1988 | Szlam | 379/88 |
| 4,790,003 | 12/1988 | Kepley et al. | 379/88 |
| 4,802,202 | 1/1989 | Takahashi et al. | 379/67 |
| 4,803,717 | 2/1989 | Marui | 379/67 |
| 4,805,207 | 2/1989 | McNutt et al. | 379/89 |
| 4,829,559 | 5/1989 | Izawa et al. | |
| 4,850,005 | 7/1989 | Hashimoto | 379/88 |
| 4,853,952 | 8/1989 | Jachmann et al. | |
| 4,860,339 | 8/1989 | D'Agosto, III et al. | |
| 4,879,743 | 11/1989 | Burke et al. | |
| 4,894,861 | 1/1990 | Fujioka | 379/374 |
| 4,916,730 | 4/1990 | Hashimoto | 379/70 |
| 4,924,496 | 5/1990 | Figa et al. | |
| 4,930,152 | 5/1990 | Miller | 379/214 |
| 4,935,954 | 6/1990 | Thompson et al. | 379/89 |
| 4,961,216 | 10/1990 | Baehr et al. | 379/56 |
| 5,003,575 | 3/1991 | Chamberlin et al. | 379/89 |
| 5,003,577 | 3/1991 | Ertz et al. | 379/96 |
| 5,050,206 | 9/1991 | Shimanuki | 379/67 |
| 5,163,082 | 11/1992 | Karnowski | 379/88 |

*Primary Examiner*—James L. Dwyer
*Assistant Examiner*—Fan Tsang
*Attorney, Agent, or Firm*—Darby & Darby

[57] ABSTRACT

A telephone answering device (TAD) which includes a means of intelligently organizing voice messages, associated entered codes such as personal IDs and home telephone numbers, and information stored in the memory of the TAD. These codes or numbers are decoded by means of the caller entering DTMF signals into the telephone which are recognized, recorded and processed by the TAD. When processed with codes and personal information previously entered into the device's memory, the TAD displays the identity of the callers for each message, thus providing a menu of choices, i.e., a list of callers. This enables the user to access messages in a selective manner based on the identity of the caller. The need to listen to the actual voice messages to determine the caller's identity and the need to listen to the messages sequentially or chronologically is obviated, saving both time and effort. Additionally, because the voice message is also linked to pre-stored additional data in the data base, when hearing a message, one also can view relevant associated information, such as a fax number, etc., that might not have been left in the audio message but might be important. A remote access device is also provided that allows the user to retrieve and display the callers' identities and select a message to be played back from a remote location.

16 Claims, 13 Drawing Sheets

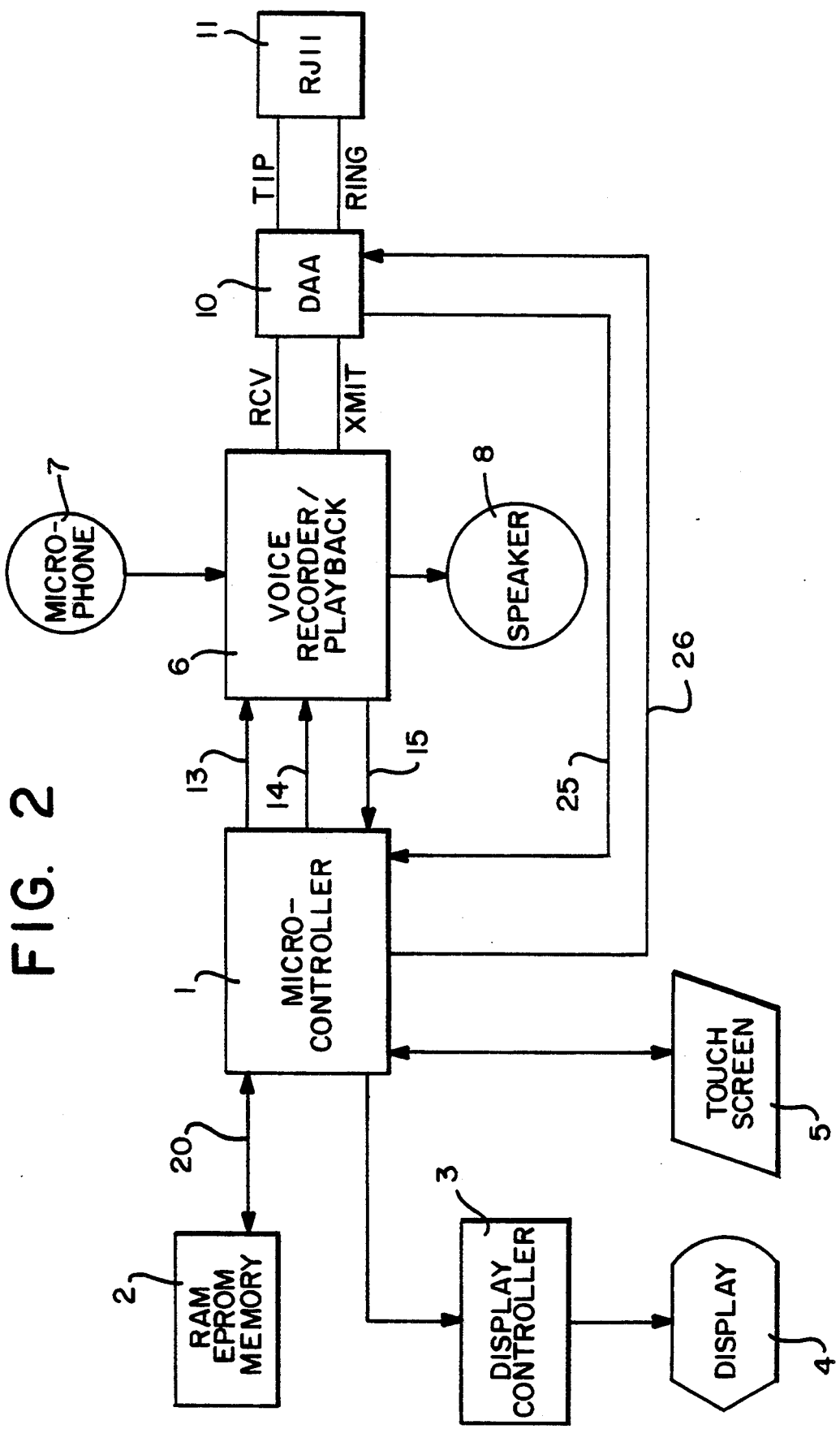

FIG. 6

MEMORY SECTION 1

1. THORNTON ALUCKET - 417-6832(H), 371-6288(O), 230 WEST RD., FAIRVIEW CITY, VICE PRESIDENT RLB CORP.
2. SID CEASER - 497-6201(H) 331-2677(P), ROCKWELL DRIVE #34, PISTON LAKES, BIRTHDAY 11/17/16
3. PAT DOBBS - 661-4199(O) 817-3121(H)
4. LUCY FROCK - 637-4064(H), 12 E 9ST. N.Y.C., 229-8019(F)
5. FRAN GRILLARD - 729-6555 (H), 219-8663(O), 919-3342(F), 407 NEWTON LANE, PIANO TUNER
6. REGIS LAMB - 431-9762(H), 211-0162(M), 431-2400(O), 684-3199(F), 34 E. 6 ST.

FIG. 7

MEMORY SECTION 2

MEMORY SECTION 3

1. "PLEASE DIAL IN YOUR PHONE NUMBER ON A TOUCH TONE PHONE AND THEN LEAVE A MESSAGE. THANK YOU."
2. "HI, THIS IS SID; PLEASE BRING THE YELLOW BALLOONS WHEN YOU COME OVER TONIGHT."
3. "MS. DOBBS HERE. I'LL BE IN MY OFFICE TILL 5:30, THEN AT HOME."
4. "YOUR FRIEND ALICE, SEE YOU LATER TONIGHT."
5. "THIS IS MR. LAMB. I'LL BE IN MY CAR UNTIL ABOUT 4:00 P.M."

FIG. 9

1. SID CEASER - 497-6201
2. PAT DOBBS - 661-4199
3. ALICE POOB - 786-5035
4. REGIS LAMB - 431-9762
5. MARY PRESTO - 382-6579
6. WILLY SMITH - 887-7200

FIG. 10

REGIS LAMB
   HOME # 431-9762
   MOBILE # 211-0162
   OFFICE # 431-2400
   FAX # 684-3199
   34 E. 6 ST.

TELEPHONE ANSWERING DEVICE LINKING DISPLAYED DATA WITH RECORDED AUDIO MESSAGE

This application is a continuation-in-part of U.S. patent application Ser. No. 860,699, filed Mar. 31, 1992, which is now U.S. Pat. No. 5,283,818.

FIELD OF THE INVENTION

The present invention relates to a device for recording and recalling messages received through telecommunication. More specifically, the invention relates to a telephone answering device that displays information about messages recorded within the device and provides selective access to those messages based on the displayed information.

BACKGROUND OF THE INVENTION

Most everyone is well acquainted with the standard telephone answering machine. Such a machine is hooked up to a telephone and by means of a tape recorder device and magnetic tape, it records oral messages from the caller. While such a machine has the advantage of allowing the user to receive messages when he is not present and cannot answer the phone, it has several disadvantages:

(1) The owner of the machine must play back many minutes of taped voice messages just to know who has called. (2) The owner can not intelligently search for a specific caller's recorded message. (3) To retain a list for later callback after listening to messages, the owner must either keep tape unerased, or must copy down the list with a pen and paper. (4) The caller must speak his name, phone number, etc. into his phone which is then transmitted through the phone system and recorded on the answering machine on the other end of the line. Since many callers feel uncomfortable talking to machines, some callers don't leave messages and merely hang up the phone. (5) An additional inconvenience occurs when the user wishes to retrieve stored messages by phone. He must on occasion hang on the phone for many minutes for all recorded voice messages to be played in their entirety and must copy with pen and paper in order to have a hard copy. This is not only inconvenient, but may be quite costly, particularly if the call to retrieve messages is a long distance call and the user is interested in a particular message that is preceded by a number of lengthy, less interesting, voice messages.

A partial solution to many of these disadvantages was offered by the "Telephone Electronic Answering Device" (TEAD) by the present inventors, disclosed in U.S. Pat. No. 4,304,968, which is incorporated herein by reference. The TEAD is capable of receiving and storing messages such as the callers' names and telephone numbers and times of receipt of such messages by converting dual tone-touch tone frequencies (DTMF) or rotary dial pulses, generated by the caller dialing his own phone number, into proper digital data representing the caller's phone number and indicating the caller's name if pre-stored in memory by the user. The entire pre-stored message could then be retrieved and displayed on command on a display provided on the TEAD or printed out to provide a permanent record.

The message stored by the TEAD, however, is limited. It only includes information pre-stored in its internal memory that is associated with a caller's phone number, or, in some instances, only the caller's number and the time of day. It is known that in many environments, caller's wish to leave more information in their messages, such as the urgency of the call. In many cases, a return call is not necessary if a simple descriptive message is left. With the TEAD, the user would have to call back the caller to get any such message in person, wasting time, effort and telephone line charges. The TEAD does provide some mechanism for leaving slightly more information by selecting from a limited menu of messages, such as "Urgent," but playing that menu for the caller takes time and the menu choices will only cover a very few limited choices of the messages that callers actually want to leave.

To retrieve messages over the phone, a similar TEAD can be used from a remote telephone. The user can call his own "base" TEAD and cause it to output the DTMF tones for all the received calls in rapid succession over the phone line. These are received acoustically by the remote TEAD and converted, as with the base TEAD, and displayed. Of course, the displayed messages have only the same limited information as the base unit's display.

Also currently available are voice mail systems, which organize voice messages according to the called party. Each stored message is associated with one or more persons that are service members of the voice mail system. Each voice message to a called party is then organized sequentially in chronological order as in the prior art sequential tape recording answering devices. These voice mail systems lack the ability to access a voice message selectively by name, since there is no way a user can determine the identity of any of the callers without listening to the messages.

It is also known that digital recording of voice messages can be used to replace the magnetic tape, but again selective accessing of a particular individual's messages in selective order is not possible.

SUMMARY OF THE INVENTION

Thus, it is an object of the invention to provide a telephone answering device ("TAD") that allows visual identification of callers' identities and selective access to their linked recorded voice messages.

It is a further object that the TAD provide a link between each recorded voice message and personal information pre-stored in data base memory related to that caller.

It is a further object of the invention to provide a TAD that displays a list of all caller's identities and that displays such list so that the user may selectively access the voice message associated with a given caller without having to listen to all preceding voice messages.

It is another object of the invention that visual identification of the callers' identities and the ability to selectively access their linked recorded messages is possible remotely over the telephone lines.

In accordance with the objects of the invention, a telephone answering device (TAD) is provided which includes a means of intelligently organizing voice messages, associated entered codes such as personal IDs and home telephone numbers, and information stored in the memory of the TAD. These codes or numbers are decoded by means of the caller entering DTMF signals into the telephone which are recognized, recorded and processed by the TAD. When processed with codes and personal information previously entered into the device's memory, the TAD displays the identity of the caller for each message, thus providing a menu of choices in the form of a list of the callers' names. This enables the user to access individual messages in a selective manner based on the identity of the caller. The need to listen to the actual voice messages to determine the caller's identity and the need to listen to the messages sequentially or chronologically is obviated, saving time and effort. Additionally, the voice message is also linked to pre-stored additional data in the data base. Thus, when hearing a message, one also can view relevant associated information, such as a fax number, alternate phone number, etc., that might not have been left in the audio message but might be important.

A remote access device is also provided that allows the user to retrieve and display the callers' identities and select a message to be played back from a remote location.

BRIEF DESCRIPTION OF THE DRAWINGS

The above and other objects and advantages will become apparent to those skilled in the art upon reviewing the detailed description of the preferred embodiments in conjunction with a review of the appended drawings, in which:

FIG. 2 is a block diagram illustrating the major functional circuit blocks and their connections of the TAD;

FIG. 6 is a chart illustrating the contents of a first memory section of the invention;

FIG. 7 is a chart illustrating the contents of a second memory section;

FIG. 8 is a chart illustrating the contents of a third memory section;

FIG. 9 is an illustration of the display of the invention, listing received calls;

FIG. 10 is an illustration of the display recalling information linked to one of the callers;

DETAILED DESCRIPTION OF THE PREFERRED EMBODIMENTS

Figure 1:
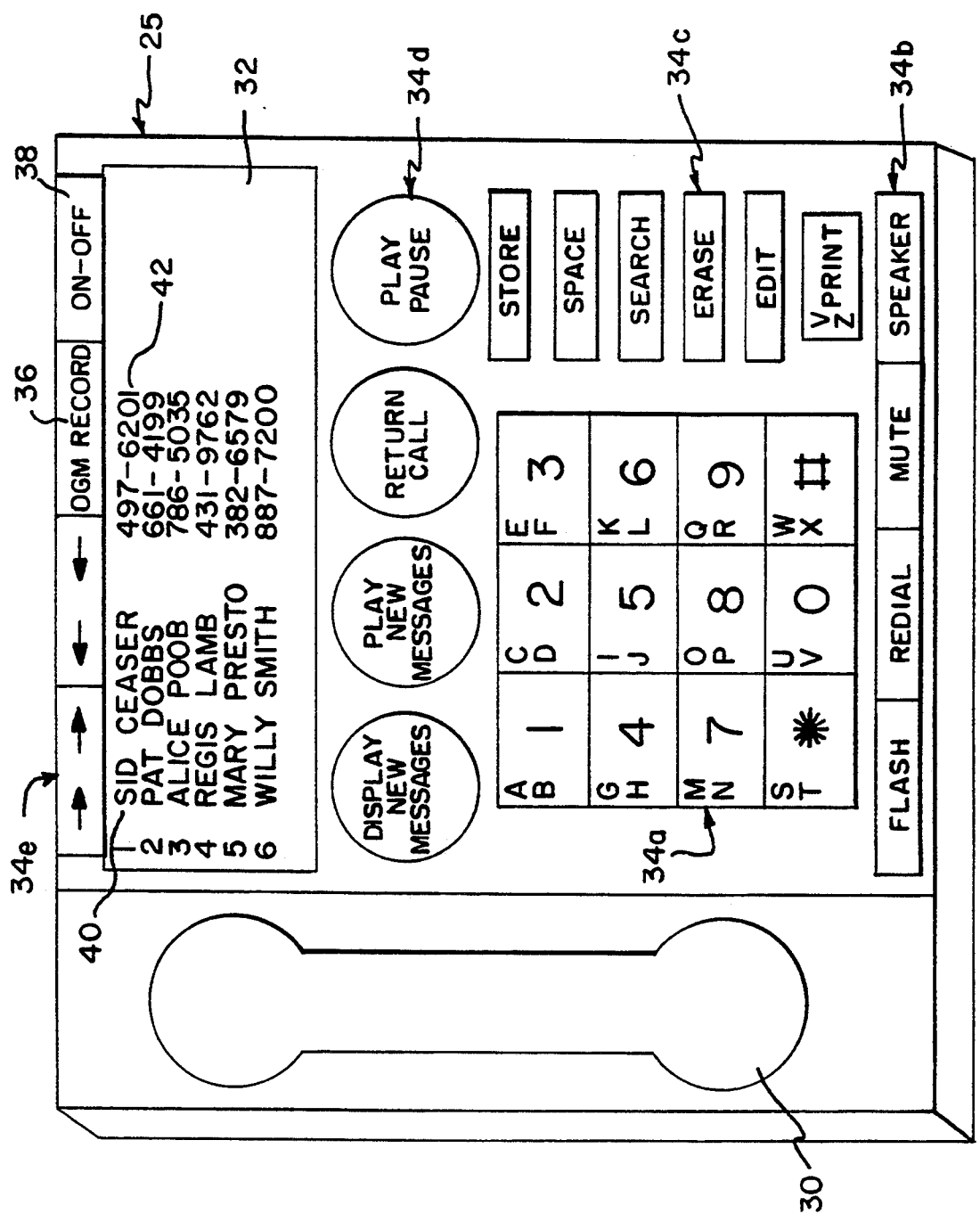
FIG. 1 is a front perspective view of a telephone answering device according to the present invention.

FIG. 1 illustrates the front perspective view of a telephone answering device (TAD) 25 according to the invention. The TAD preferably includes a standard telephone handset 30 having a microphone and speaker for audio communication with a user. The remainder of the TAD preferably includes a display/touch screen 32 and various keys 34 used to activate functions of the TAD. Some of the keys 34a are arranged as a numeric keypad, similar to standard touch-tone telephones. This allows the TAD to be used as a standard telephone, as well as providing access to alphanumeric input by the user. Another set of keys 34b below the numeric keypad includes other standard telephone functions, such as flash, redial, mute and speaker, which allows audio communication without the handset, as is known.

A third set of keys 34c are used for access to a stored database within the TAD that contains information about callers, as described more fully below. Inputting the information to the database is accomplished similarly to the disclosure of the inventor's above-mentioned U.S. Pat. No. 4,304,968 or in any fashion known in the art. A fourth and fifth set of keys 34d,34e are used for accessing identification data about recorded messages and then accessing and retrieving those messages. A key 36 for recording the outgoing message of the TAD is included, as is a standard "on-off" key 38. All of these keys 34a-e,36,38 and their functions are described more fully below with respect to the preferred embodiment. Of course, other arrangements of keys and input devices are contemplated by the invention.

The display/touch screen 32 is shown in a state when several messages have been received and recorded by the TAD. The display preferably indicates the identity 40 and phone number 42 of the callers who recorded the messages, the identity information preferably being retrieved from the database as described more fully below. Through actuation of the touch screen 32 or keys 34d,34e, it is possible to playback any of the voice messages left by the displayed callers, in any sequence, and to perform other functions, such as automatically dialing the particular caller's number to return the call, as described more fully below.

By creating an internal link between the recorded voice message and stored digital database data, an intelligent organized voice/data message (IOVDM) is formed that can be displayed with alphanumeric information, played back as analog recorded voice, processed in a database, etc.

FIG. 2 illustrates the block diagram of the circuit elements comprising an embodiment of the present invention.

The microcontroller 1 is preferably a 68HC11, manufactured by Motorola Semiconductor. The microcontroller internally is comprised of memory 2 containing RAM memory and EPROM memory circuits that are known to those skilled in the art. The RAM memory functions as read/write memory used for storing data and temporary system status events of the microcontroller. In the present invention, the RAM memory of the microcontroller 1 is also used for the storage of telephone numbers, names, user identification codes, other information about callers, and voice messages. Similarly, the EPROM memory stores the program instructions for the control and operation of the microcontroller. These circuit elements are organized and connected in a data/address and control circuit bus structure 20, the general structure of which is known in the art.

The display controller 3 is a known circuit that converts data and control signals from the microcontroller unit into video signals that produce character and graphic information on the display unit 4. The display controller 3 is preferably a circuit comprising the Signetics 2670, 2672 and 2673 CRT controller integrated circuit set. The display controller 3 drives the display unit 4 to produce visual display output with character and/or graphic indicia to be presented to the user.

The display unit 4 is overlaid with a touch screen 5, such as that available from Microtouch, Wilmington, Mass. The touch screen 5 is an input device that presents an X-Y positional coordinate pair to the microcontroller 1 indicating the position touched on the screen 5. Through the use of software within the microcontroller memory, the touch screen is positionally mapped onto the underlying indicia, allowing the user to select or indicate information and functions displayed on the display unit 4.

The speech recorder/playback and DTMF transceiver circuit 6 is preferably comprised of the DS2271DK speech recorder/playback board manufactured by Dallas Semiconductor, Dallas, Tex. Illustrated in FIG. 2 is the microphone input 7 and the speaker output 8 interfaced to the speech recorder/playback circuit 6 which enables the user to record and playback voice messages.

The function of the voice record/playback circuit 6 is to record voice messages into and from the memory 2, and to later play back these voice messages. Other functions of the circuit 6 include DTMF decoding, line status determination and DTMF generation. The messages are recorded either through the microphone unit 7, which is intended for the recording of the outgoing message, or through the data access arrangement circuit (DAA) 10 that interfaces tip and ring lines to a standard RJ11 jack 11, which is preferably connected to a line on the public telephone network. The voice playback function provides an output voice signal either through the speaker 8 or through the DAA 10 connected to the telephone line. The DAA 10 is preferably the CH1840 manufactured by Cermetek Microelectronic Company, Sunnyvale, Calif.

The DAA 10 also provides a signal indicating the incoming ring signal status to the microcontroller 1 via wire connection 25 as illustrated. After a preprogrammed number of ring signals, which may be adjustable, the TAD answers the call by providing a signal on line 26 to the DAA 10, which causes the DAA 10 to put the telephone line in the off-hook state, thereby causing the TAD to answer the call.

Voice signals are transmitted to and from the telephone line through the RJ11 connector 11 and pass through the DAA 10 to the voice recorder/playback circuit on RCV and XMIT1 lines. Voice signals are in analog form when inputted to the voice recorder/playback circuit 6. As illustrated, these connections RCV and XMIT1 are capacitively coupled between the DAA 10 and the voice recorder/playback circuit. The voice signal is preferably digitized and stored in the voice memory section of the memory 2 by means of the recorder/playback circuit 6, although other storage means, such as analog memory circuits, are possible.

The microcontroller 1 controls the functioning of the voice/playback circuit such as with PLAY, RECORD, ERASE, and STOP signals along with the signals corresponding to message numbers.

The PLAY, RECORD, ERASE, and STOP signals to the recorder/playback circuit 6 are received from the microcontroller via the output bus 13 as illustrated. These control functions are activated by means of the microcontroller toggling pins connected to bus 13, and selecting the desired message number through an output port on the microcontroller 1 via the bus connection 14 as illustrated.

The DTMF signals received from the telephone network are decoded as is known by the voice recorder/playback circuit 6. Through the same circuit, the energy level on the telephone line can be detected, indicating to the microcontroller if there is voice signals on the line (varying energy level), DTMF signals (steady, known energy levels), or a dial tone or silence on the line (steady high or low energy level). The determination of the status of the line, in conjunction with the user setup mode provides input to the decision of the next machine operation, as will be illustrated.

System Operation

Figure 3A:
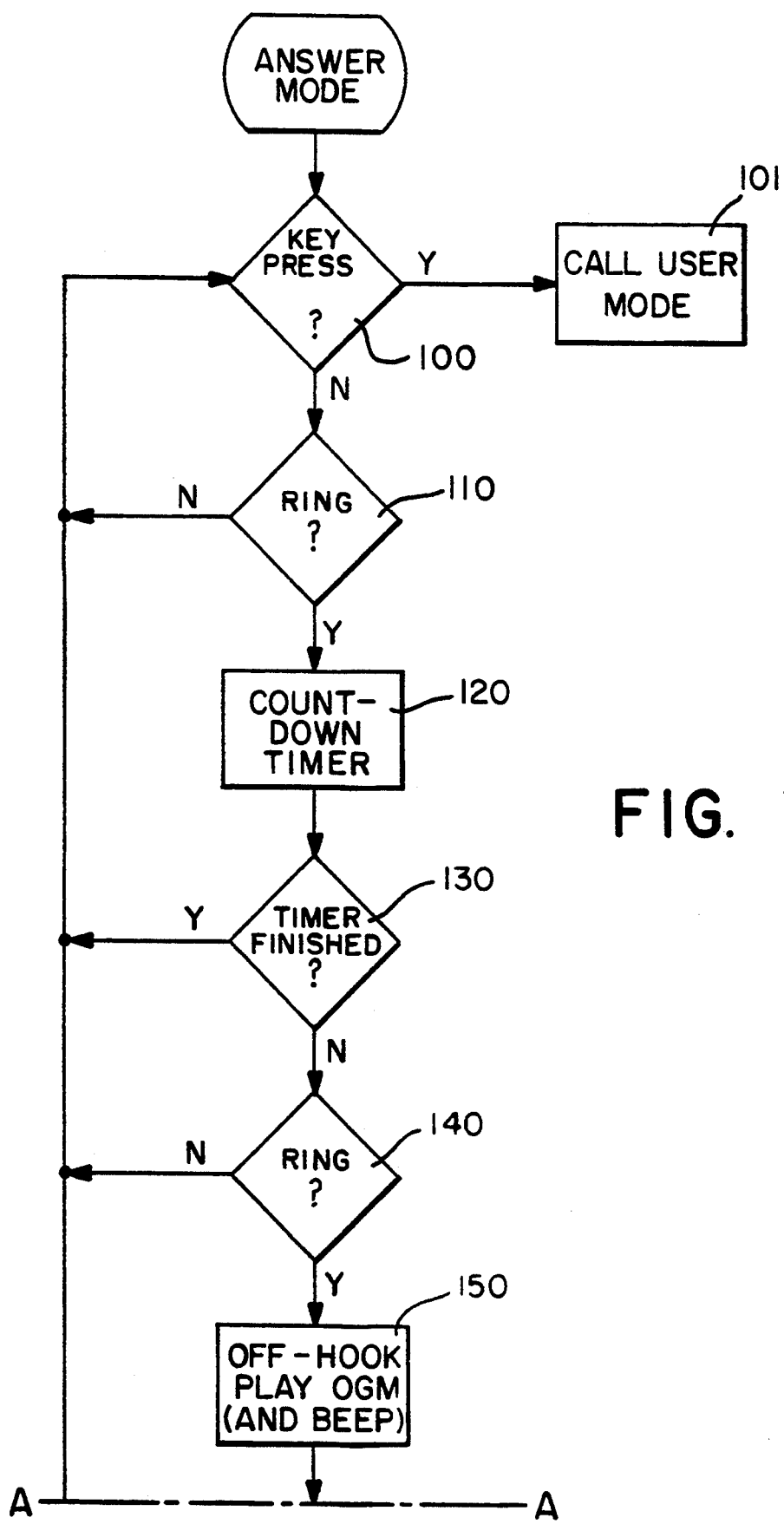
FIG. 3 is a flowchart illustrating the answer mode of the present invention.
Figure 3B:
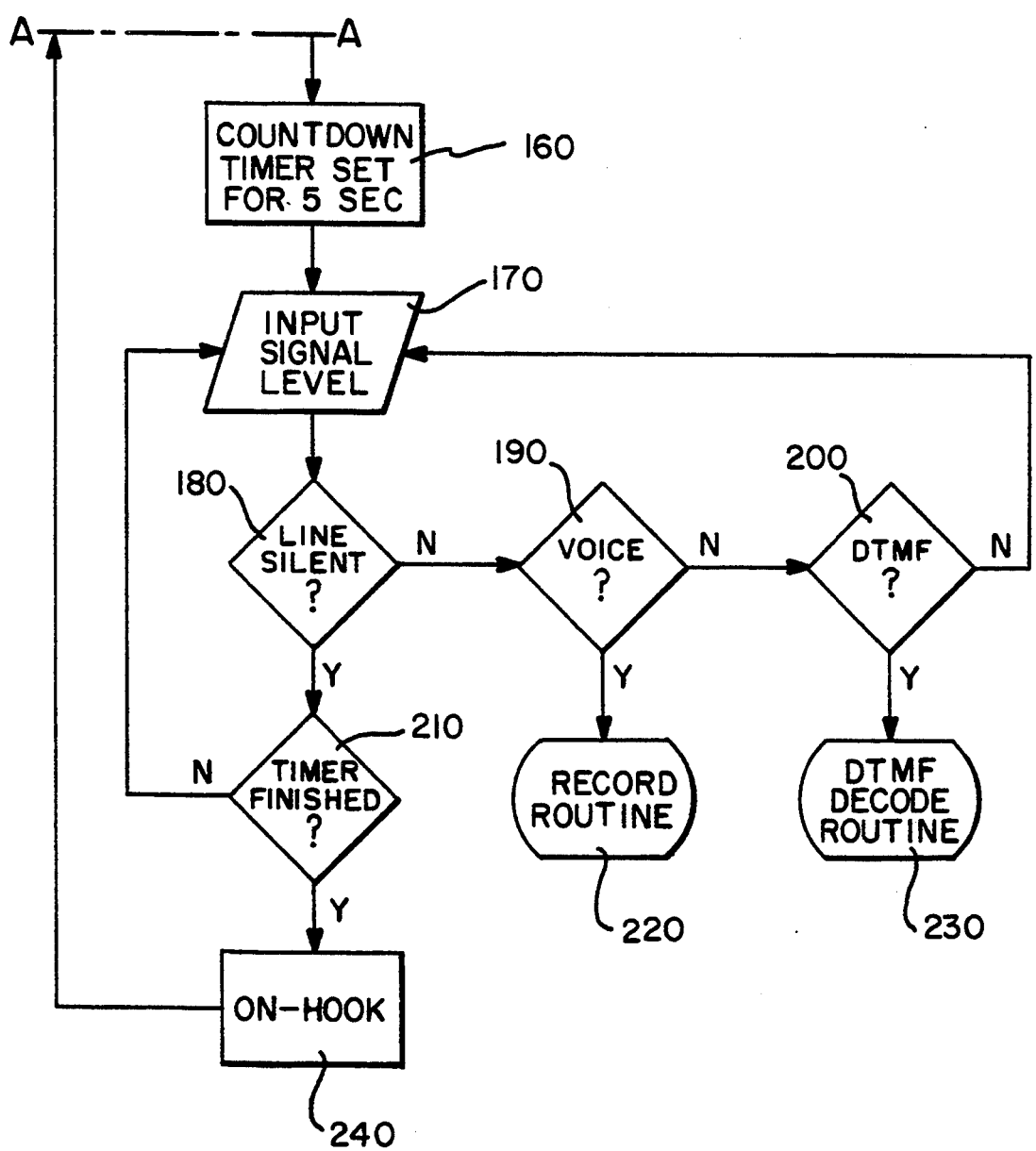

FIG. 3 is a flowchart illustrating the answer program mode of the present invention, in which the TAD loops and checks for an incoming call on the telephone line or for the user to activate a key.

As illustrated in FIG. 3, the TAD first determines if the user has pressed a key on the TAD (Decision block 100). This is done by means of the microcontroller reading its RS232 serial data port connected to the touch screen 5 through connection 20 to determine if the screen has been touched. The microcontroller 1 is also connected to and monitors the other keys 34a–e on the TAD. If an X-Y coordinate pair is read and the parameters of the X-Y pair map onto the boundaries of a known key, a true key has been depressed and the microcontroller 1 calls the user mode routine (block 101).

If no key has been pressed, the system next tests if a ring signal is available (block 110). If a ring signal is available, determined by reading the state of the DAA 10, the microcontroller then proceeds to block 120 in which it reads the variable stored in memory indicating the number of rings to wait before answering the incoming call (INC). The microcontroller then preferably multiplies this number by 6 (a standard ring is 2 seconds with a 4 second silence gap) and counts down that number of seconds before answering.

As illustrated, during this delay, the microcontroller checks every 6 seconds to determine if the ringing has stopped, If no ring is present, this indicates that the caller hung up. The microcontroller would then return to block 100. If the timer successfully counts down, the system progresses into the outgoing message state (block 150).

The microcontroller causes the DAA to create an off-hook state and then causes the voice/recorder playback circuit 6 to transmit the pre-recorded outgoing message (OGM) through the DAA to the telephone line. The OGM is preferably stored as message #1 in memory 2. As described below, the OGM includes instructions for the caller to enter a home phone number or other caller identifying information.

When the playing of the OGM is completed, the microcontroller preferably waits 5 seconds (block 160). This 5 second grace period prevents malfunction of the TAD due to silence by the natural pause or hesitation of a caller before or during enunciation of a message. At block 170, the microcontroller determines if voice or DTMF signals are being transmitted. The microcontroller can distinguish three states during a call—voice signals, DTMF signals, or dial tone/silence—by reading the level and modulation of the signals on the telephone line. The DS2271DK voice recorder/playback unit can distinguish between the tones of DTMF signals and the signal level ranges associated with human speech detected on the telephone line. If voice signals are detected, the microcontroller immediately executes the voice record routine. If no voice is present on the line, but DTMF signals are being transmitted, the microcontroller executes the DTMF decode routine.

If, however, there is dial tone/silence on the telephone line for 5 seconds, the microcontroller causes the DAA to go into the on-hook mode (block 240), which hangs up the phone and terminates the call. The TAD now returns to its initial state in the answer mode routine of looping and checking for a user key touch and waiting for a ring signal.

The process for determining line silence, voice energy or DTMF signaling is illustrated in blocks 180, 190 and 200. If block 190 is true (voice energy levels present), program execution follows to block 220, the record routine. If, however, there is a DTMF tone present, execution follows to block 230, the DTMF decode routine.

Figure 4:
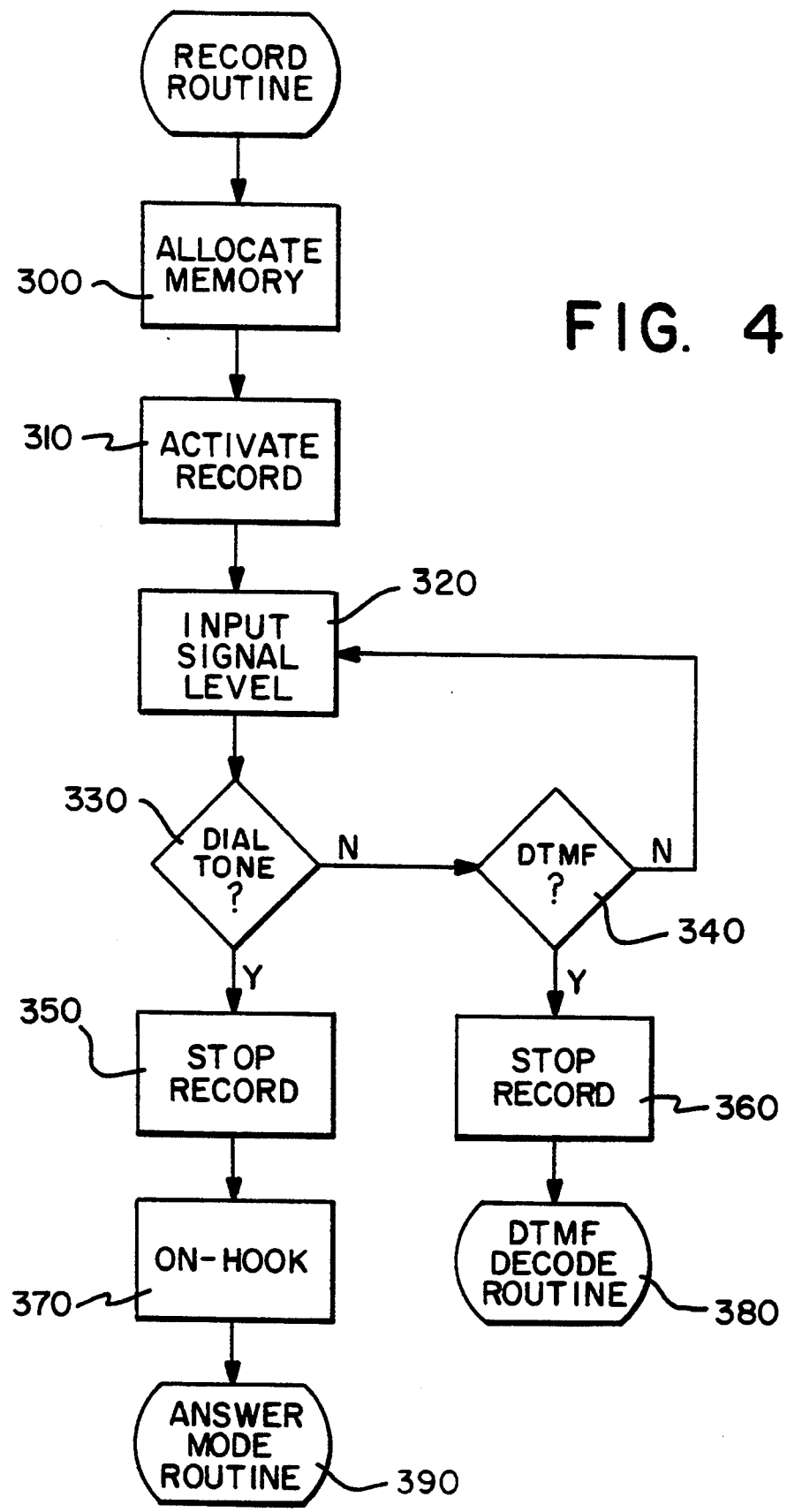
FIG. 4 is a flowchart illustrating the record mode of the present invention.

Block 220, the record function, is illustrated in FIG. 4 and begins with the allocation of voice memory and data memory at block 300. This function increments a memory variable stored in EPROM that points to the next memory position allocated in the voice memory and data memory stored in memory circuit 2. This process is a preferred way to help organize the data and voice memory and link them together. Memory organization of the TAD is described more fully below.

At block 310, the voice message memory is accessed. The record function is then executed and voice recorder/playback circuit begins digitizing the analog voice and stores this data sequentially in the voice memory 2. The record function is now in process and operating as a parallel task to the task of determining the line status. At block 320, data is then analyzed at block 330 (is there a dial tone). If this test is false, the block 340 (is there a DTMF tone) is executed.

If both these blocks (330 and 340) generate a false, then control is looped back to block 320, input signal levels, and allows the voice record routine to continue. This looping back will compensate for momentary silence or gaps in the voice message. If block 330 is true, i.e., there is a dial tone, then the voice recording routine is stopped at block 350 and the telephone line is put on-hook at block 370. The TAD then returns to answer mode (shown in FIG. 3) at block 390.

Figure 5:
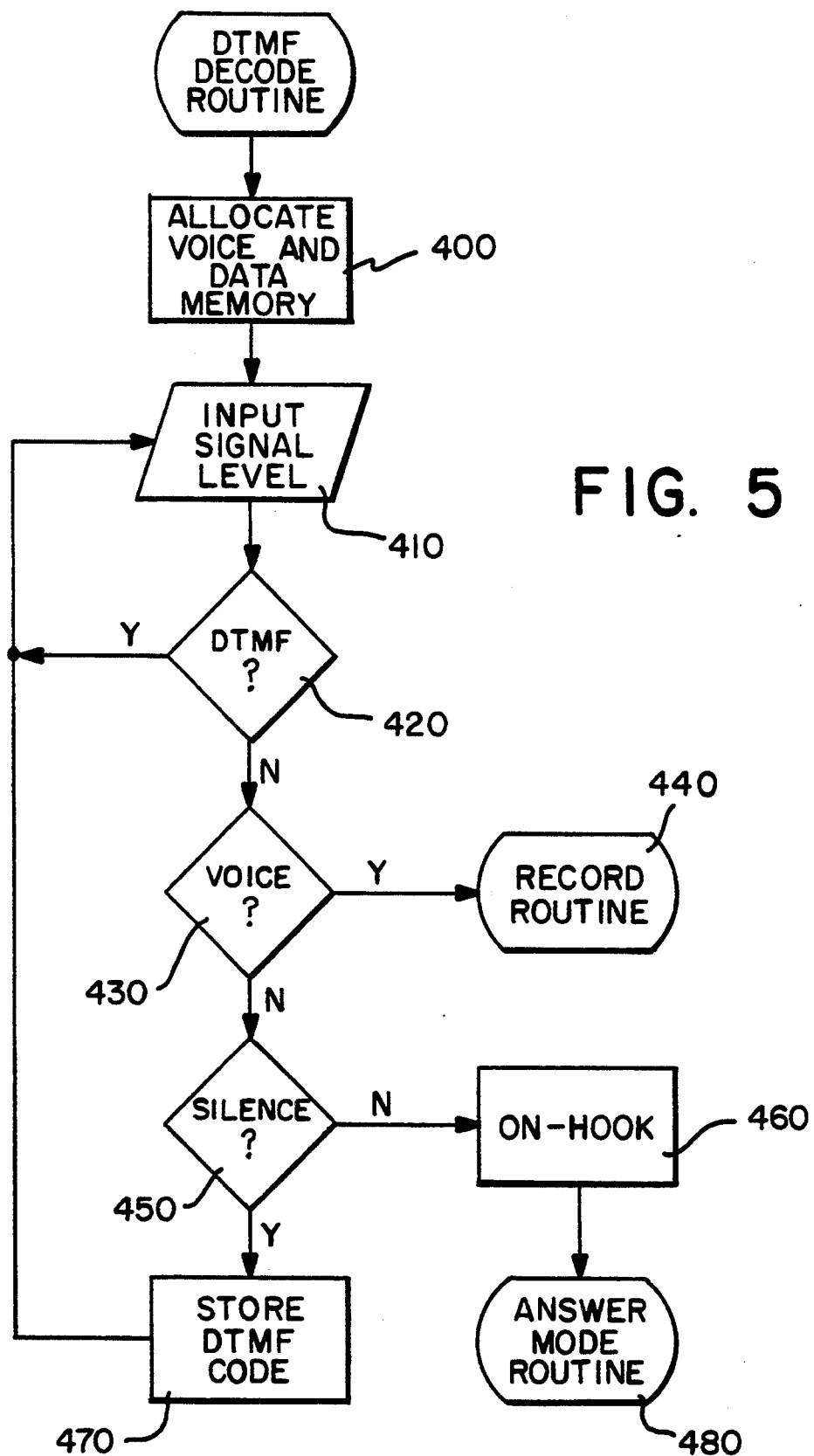
FIG. 5 is a flowchart illustrating the DTMF decode routine of the present invention.

If block 340 is true, which means there is a DTMF signal, the record routine is stopped at block 360 and block 380 calls the DTMF decode routine shown in FIG. 5. This routine decodes the DTMF signals keyed into the telephone by the caller and stores the code in memory of the TAD and links it to the voice memory if a voice message is recorded.

Operation is transferred to the DTMF decode routine when a DTMF signal is sensed on the telephone line, the routine begins at block 400 (allocate voice and data memory). This process sets up data memory for receiving the DTMF signaling and links the data memory to voice message memory if a voice message has already been recorded. If a voice message has not yet been recorded it allocates an available message number in case a voice message is left later. This allows the system to be flexible and will allow the caller to key in a DTMF I.D. code anytime during the message sequence.

Control proceeds to block 410 to read the levels of the telephone line. At block 420, the microcontroller determines if there is still a DTMF signal on the line.

If block 420 is true, control is looped back to input block 410. This input and test loop continues until the DTMF signal stops indicating either the standard silent interval between DTMF digits or perhaps that the DTMF signaling has been completed and a voice message has been initiated. If decision block 420 generates a false, it is determined at block 430 if a voice signal is present. If a voice signal is present, block 440 passes control back to the record function routine of FIG. 4.

If no voice signal is on the line, block 430 generates a false, and control passes to block 450 in which it is determined if silence or a dial tone is present on the line. Silence indicates an inter-digit silence and control passes to block 470, which stores the decoded DTMF digit and passes control back to block 410 to read the next DTMF digit.

If, however, there is dial tone on the line, indicating that the caller has disconnected, block 450 instead passes control to block 460, which puts the TAD in the on-hook mode and proceeds to block 480. Block 480 passes control to the answer mode routine of FIG. 3. Now, the TAD is ready for a new incoming call or for the user to activate a key function by pressing the touch screen.

Memory Organization

The memory circuit block 2 (FIG. 2) connected to the microcontroller 1 as further illustrated in FIGS. 6, 7 and 8 is the storage means where the user options, commands, data and voice messages are stored and interact with the microcontroller unit 1 and the voice record/playback circuit 6 in order to accomplish the features as taught in the present invention.

The data entered by the user for the functioning of the present invention includes textual names of the callers as they would appear on the display 4, for example, "Sid Ceaser," as well as user's identification code, i.e., 497-6201, and additional related data. This data is stored in the memory and organized by the database portion of the programming in memory section 1 illustrated in FIG. 6. The address or relative position of this data in the memory section can change as new names are entered or deleted as controlled and organized by database functions in the microcontroller.

The recorded messages which are entered by the caller can be composed either of 1 or 2 parts, a digital data part and a digitized analog part. The first part, which is the digital data portion, is composed of the data acquired by the DTMF decoding function as illustrated in the flowchart of FIG. 4 and is stored as binary numbers in memory section 2 as illustrated in FIG. 7. As explained, this digital data, which is composed of the translated code as entered by the caller from DTMF keypad, preferably also contains an address link byte to the voice message if the user had also recorded a voice message along with this data message.

The voice message memory as required by the voice record/playback circuit 6 is a separate section of the memory, i.e. memory section 3 as illustrated in FIG. 8.

The voice recorder/playback circuit 6 preferably digitizes and compresses the voice message and presents it to the microcontroller which stores it in a specific format in a separate section (section 3) of memory. The format is preferably composed of 128 byte speech records of which each voice message is composed of an integral number of records. The first byte of each record contains a number specifying which message number it is part of. The valid message numbers are preferably 1 to 254 although more, of course, are possible. Therefore, a preferred maximum of 253 incoming messages exists with message 1 being the OGM. The message number in the record is used to link to the digital data message which contains the same message number.

Therefore, as explained, there are three sections of memory which can be linked together by the database program function to form an intelligent organized voice/data message (IOVDM) as taught in the present invention, These memory sections are:
Memory Section 1) The database entry by the user of the names with the associated data, such as telephone number and address, and the caller's I.D. which could be the caller's home or business telephone number or any unique code. (FIG. 6)
Memory Section 2) The message memory containing caller entered I.D. code data and linked message numbers. (FIG. 7)
Memory Section 3) The message memory containing voice message data recorded by the caller. (FIG. 8)

A message as recorded by the caller can be composed of any of the following types:
1) A voice message alone.
2) A data message alone as described in U.S. Pat. No. 4,304,968 by the inventors of the present invention.
3) A voice message as described in (1) linked to a data message as described in (2) that are linked together into an intelligent organized voice data message (IOVDM) as taught by the present invention.

The linking together of these separate data memory and voice memory elements in an IOVDM is performed by the database function and displayed on the display. To perform this linking, a reserved byte of memory attached to the data message is stored which indicates the voice message number it is linked to. The database program code then searches the database entry section in which the user entered the data such as name, address and phone number. If a match is found between these, the information is presented to the user as an IOVDM.

Other ways of linking the voice messages and data messages are possible. In one alternate configuration, each data message precedes its corresponding voice message in contiguous memory bytes.

Example of Operation

For proper functioning of the TAD, it is preferred that database information, such as names, phone numbers and address, personal and/or business reference notes, etc. is entered by the user. Using keys 34c for accessing the database, information, such as "Regis Lamb" and his associated phone number "431-9762" plus other additional information may be entered. As seen in FIG. 6, several telephone numbers can be stored for an individual. Preferably, they would be coded, for example, with an "O", "H", "M" or other letters, signifying "office", "home", "mobile", etc. The database can have as many entries as the user desires and the specific memory size will allow. The user preferably also records the OGM, which would preferably include instructions for the caller to enter his home phone number or caller identifying number on a touch tone phone and then to record a voice message.

It is to be understood that any incoming signals over the telephone line with a voice message that is recognizable by the TAD and is generally unique to the caller may be used instead of DTMF tones.

Figure 11:
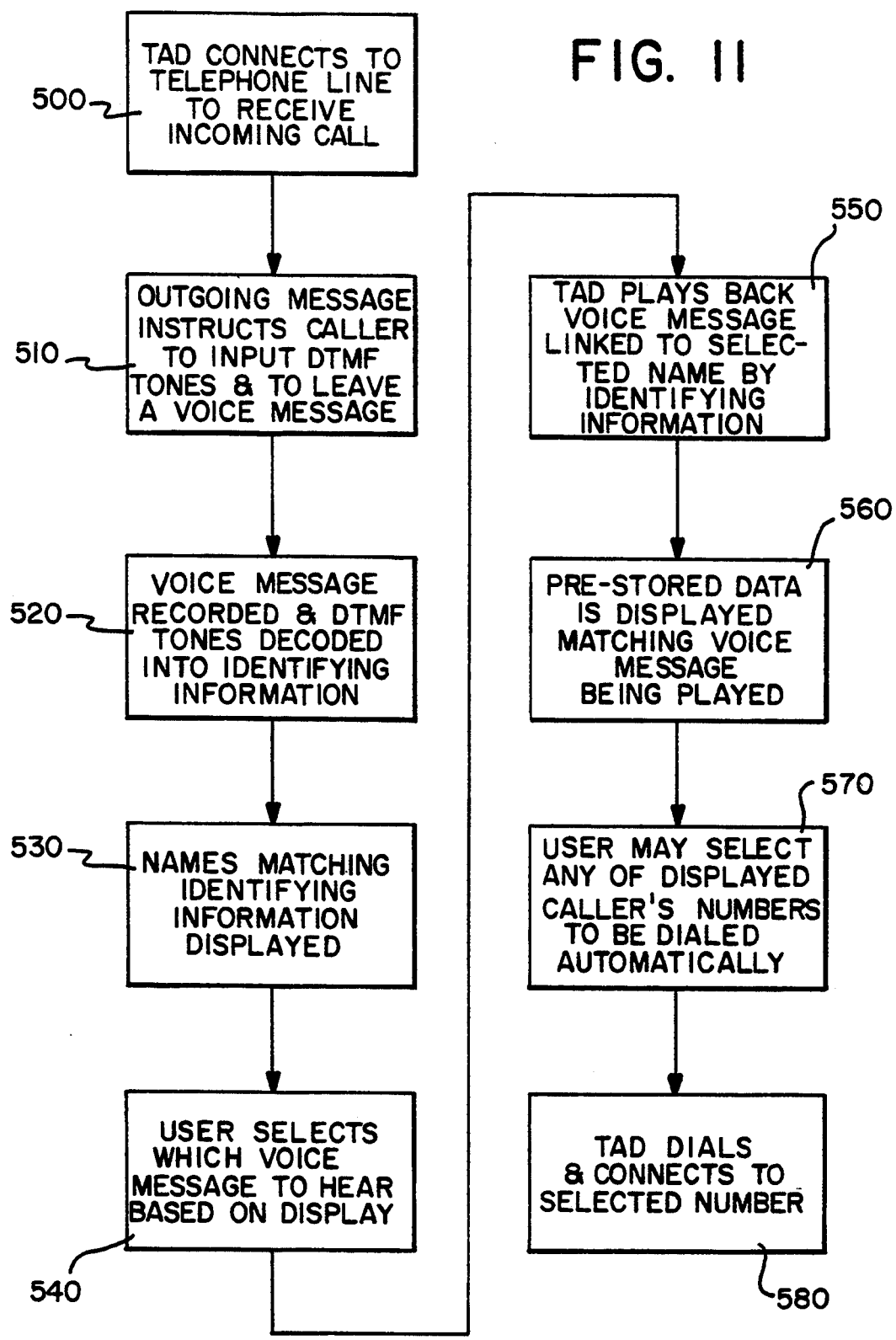
FIG. 11 is a flowchart illustrating a typical operation of the present invention.

The unit is then left in the answer mode. Upon receiving a call (detecting rings), the TAD puts the telephone line in an off-hook state (Block 500, FIG. 11) and plays the outgoing message to the caller (Block 510).

If, for example, Regis Lamb were the fourth caller since the messages were last cleared, he would enter his home phone number, as requested by the OGM (Block 520). The microcontroller records the decoded identifying information in memory section 2, along with the available message number, in this case "5", as shown in FIG. 7. The microcontroller then searches all of the phone numbers stored in the database and matches the received phone number to the stored data record and recalls Mr. Lamb's for display as message 4 (Block 530). This is shown on the example display in FIG. 9. The microcontroller also records Mr. Lamb's voice message as message number 5 (FIG. 8), linking that voice message with the recalled data record through the list in memory section 2.

Later, the user would come home and press, for example, the "Display New Messages" key to see a list of the messages as shown in FIG. 9. By pressing on Mr. Lamb's name on the touch screen or the corresponding keypad number, only the fourth message would be played back from the proper location in memory, avoiding having to hear any other unwanted messages (block 540, 550). Simultaneously, the entire data record matching Mr. Lamb could also be displayed on the display while the voice message is being played back (Block 560), as shown in FIG. 10.

By merely pressing, "Return Call," the microprocessor would retrieve the phone number from the data record and produce the DTMF tones on the telephone line to dial Mr. Lamb. If more than one phone number appears on Mr. Lamb's data display, the touch screen or corresponding keypad number could be used to select and then dial any of the numbers (Block 570, 580).

If a caller does not enter any identifying code during the phone call, the TAD will display "No ID" or another message in place of the caller's name on the display list.

Remote Access

Messages stored in the TAD can be accessed from a remote telephone by using a portable remote access device (RAD) 55, which is hand held and not directly interfaced to a phone, and in which the same list of telephone numbers and names have preferably been stored as in the user's base TAD.

Figure 12:
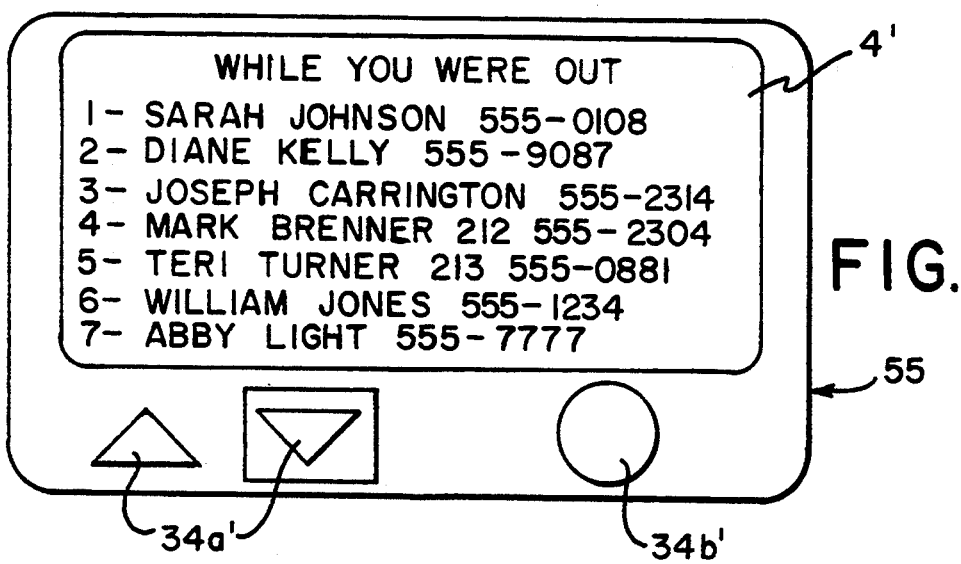
FIG. 12 is a front view of a remote access device according to the invention.
Figure 13:
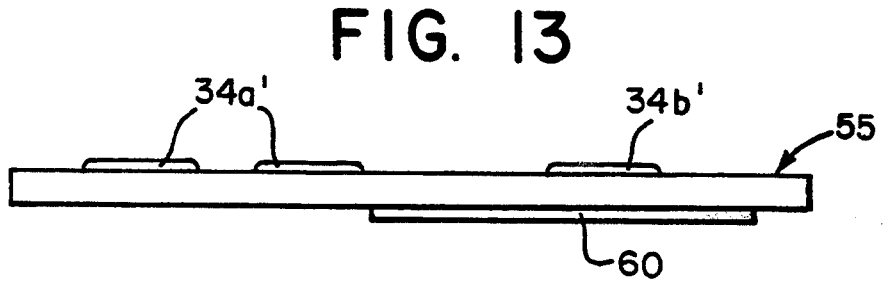
FIG. 13 is a side view of a remote access device.
Figure 14:
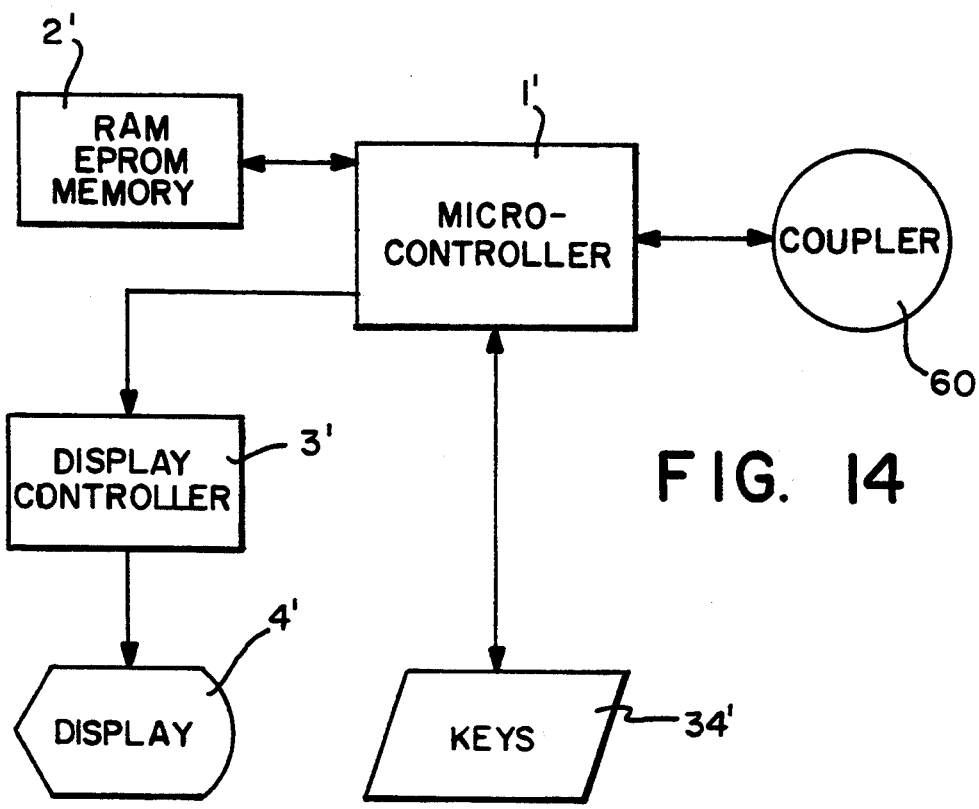
FIG. 14 is a schematic of the components and their interconnections in the remote access device according to the invention.

The preferred embodiment of the RAD 55 is shown in FIG. 12 and 13, in which it can be seen that the RAD includes a display 4', selection keys 34' and a telephone coupler 60, such as an acoustic coupler or an induction coil coupler. The internal components of the RAD are shown in FIG. 14, including the coupler 60 connected to a microcontroller 1'. The microcontroller 1' also receives input from the selection keys 34', as described in more detail below. Memory circuits 2' are also included that are similar to those described above in the TAD, except there is preferably no memory section reserved for recorded voice messages, significantly decreasing the memory requirements. The display 4' and display controller 3' are similar to those described above. There is preferably no touch screen in the RAD, although it is contemplated that it could be used similarly.

Figure 15:
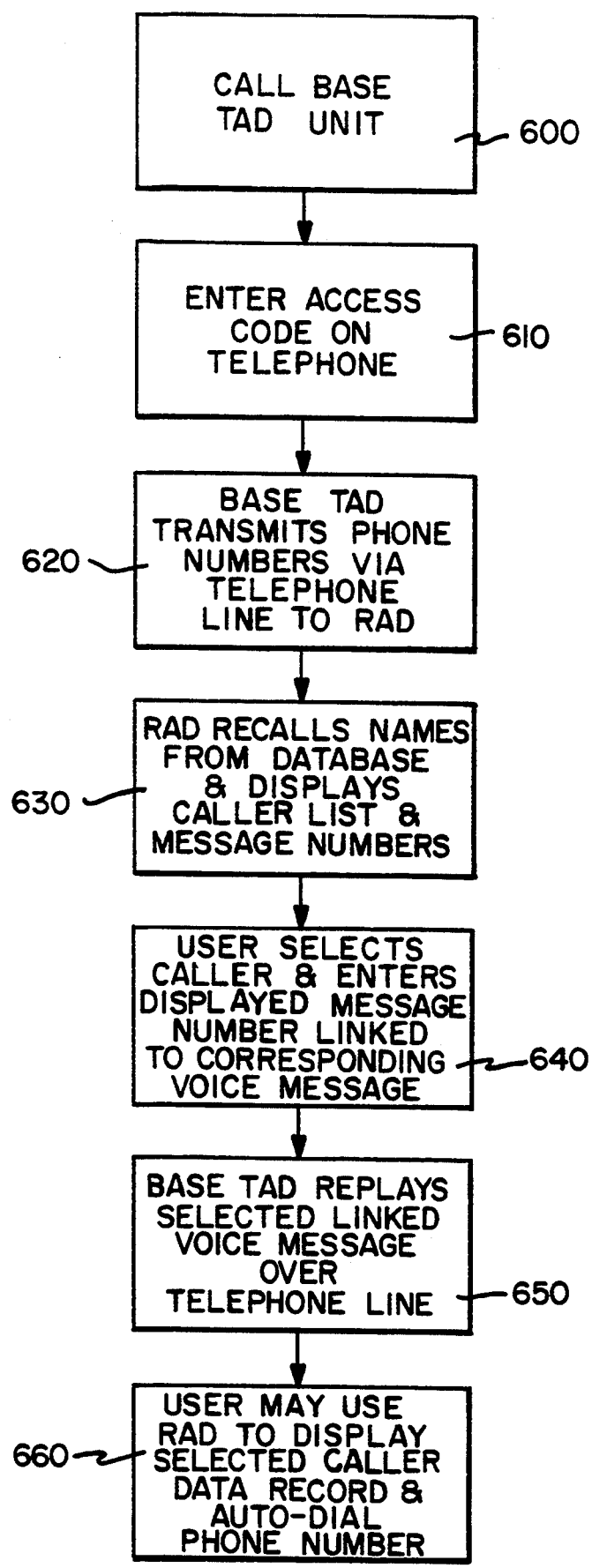
FIG. 15 is a flowchart illustrating operation of the remote access device.

The preferred remote operation using the RAD 55 is shown schematically in FIG. 15. The user first dials the telephone number (block 600) of the phone connected to the base TAD, whether it be a home or other number, and waits for the base TAD to pick up and play the OGM as described above. The user then preferably dials a code (block 610), for instance "1-1-1-1," on the phone. The audio signal generated by his dialing is received by the base TAD through the telephone line and converted by the microprocessor 1 into digital information, as discussed above. This particular code instructs the microprocessor 1 of the base TAD to feed out in rapid succession all the stored phone numbers from memory section 2 as the appropriate touch-tone frequencies (block 620), and outputs these frequencies through the telephone line to the phone the user is dialing from. The user places the hand-held RAD on the phone receiver and, via the telephone coupler 60, the DTMF tones outputted by the base TAD are received into the microprocessor 1' of the RAD 55 and converted into digital form. In this manner, the identifying phone numbers of all the callers stored in the base TAD are quickly transferred to the RAD 55 via the telephone line. The microprocessor 1' then preferably matches the received phone numbers with its internal database (block 630) and displays the list of names and numbers of the callers (see FIG. 12), as described above with respect to the TAD. Alternatively, in accordance with another embodiment of the invention, if there is no stored database within the RAD, the phone numbers alone are displayed.

Next to the names and/or numbers of the callers, the RAD displays a linking code that corresponds to message numbers, as can be seen in FIG. 12. This alerts the user to and specifies the linked recorded voice messages stored in the base TAD. It is also contemplated that the linking code might not be directly displayed, but would instead determine the order of display for the names, thus indicating the linking code for each message. The linking code is preferably transmitted indirectly by the base TAD via the order in which the DTMF phone numbers are sent to the RAD 55, i.e., the order itself being representative of the linking code.

At this point, the user may now select the message or messages that he wants to hear from the displayed list. For example, if he chooses to hear Mark Brenner's message first, he would merely press the number 4 on the telephone (block 640). The base TAD receives the DTMF signal, decode it, and proceed to playback voice message number 4 (block 650). Other messages may be played back by pressing other message numbers on the telephone. When the user is finished listening to the message, he can either press a code, such as "#" to cause the base TAD to hang up, or hang up the telephone he has been using. The TAD is preferably equipped with a timer that causes it to hang up after a predetermined period of silence during the message retrieval function. It is also contemplated that the linking codes could be completely internal to the RAD and not displayed. The user selects the voice message to be played back with the selection keys 34', using the displayed list of names as a menu. The RAD then outputs appropriate DTMF signals to the base TAD to cause it to playback the voice message. The link between the voice message and the displayed names could also be completely within the base TAD. Then, for example, the RAD could transmit entire DTMF phone numbers back to the base TAD after the user selects a particular displayed name or number. The base TAD would then play back the voice message linked to the phone number. In any case, it is important that the RAD or the user be able to communicate with the base TAD to select which voice messages it is to playback and the sequence of such playback.

After hearing the messages, the user may wish to return the call of one or several of the callers. Since the RAD is preferably pre-stored with a complete database of names and phone numbers, a particular caller on the list could be selected with the arrow keys 34a' and the entire data record retrieved with the select button 34b'. A particular number in the record could then be similarly highlighted. By pressing the select button 34b' again, while holding the RAD to the microphone of the telephone, the RAD performs as an auto-dialer, outputting the DTMF frequencies for the selected number. Other features, such as credit card calling, could also be incorporated into the RAD.

Since the RAD is separate from the base TAD, it is possible that the databases may not always be completely identical. For example, if a phone number is transmitted by the TAD to the RAD, the name of a caller matching that number might not be stored. In this case, the RAD simply displays the phone number on the screen, allowing for the possibility that the number might be recognized by the user.

It is also contemplated that the features and components of the RAD could be incorporated into existing pocket databank organizers that are known. The database for the RAD system could be shared with the other organizer functions.

Figure 16:
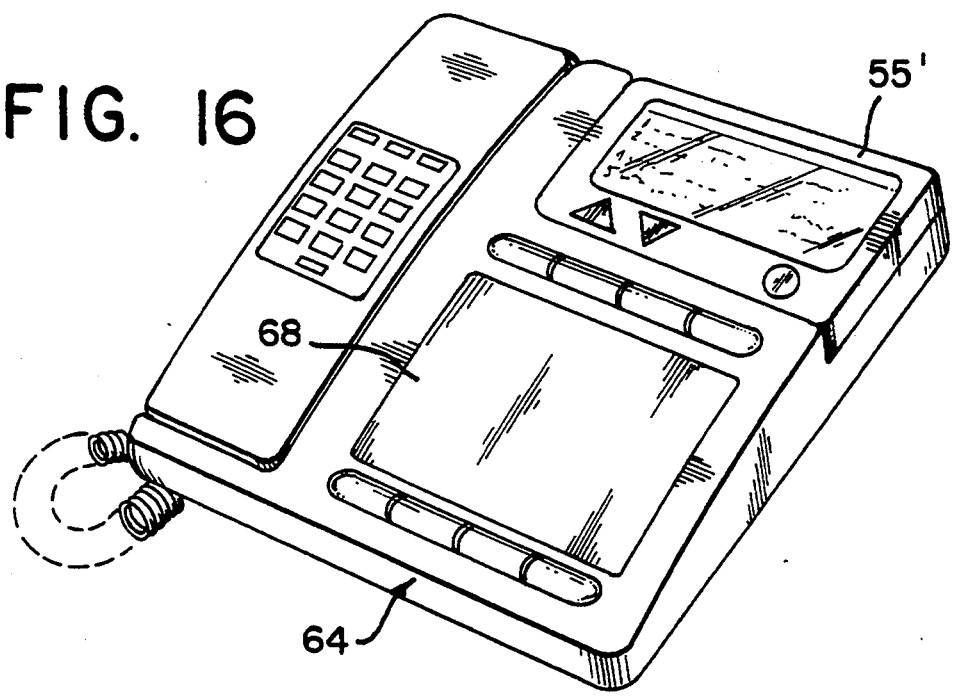
FIG. 16 is a perspective view of a modified telephone answering device including a remote access device.
Figure 17:
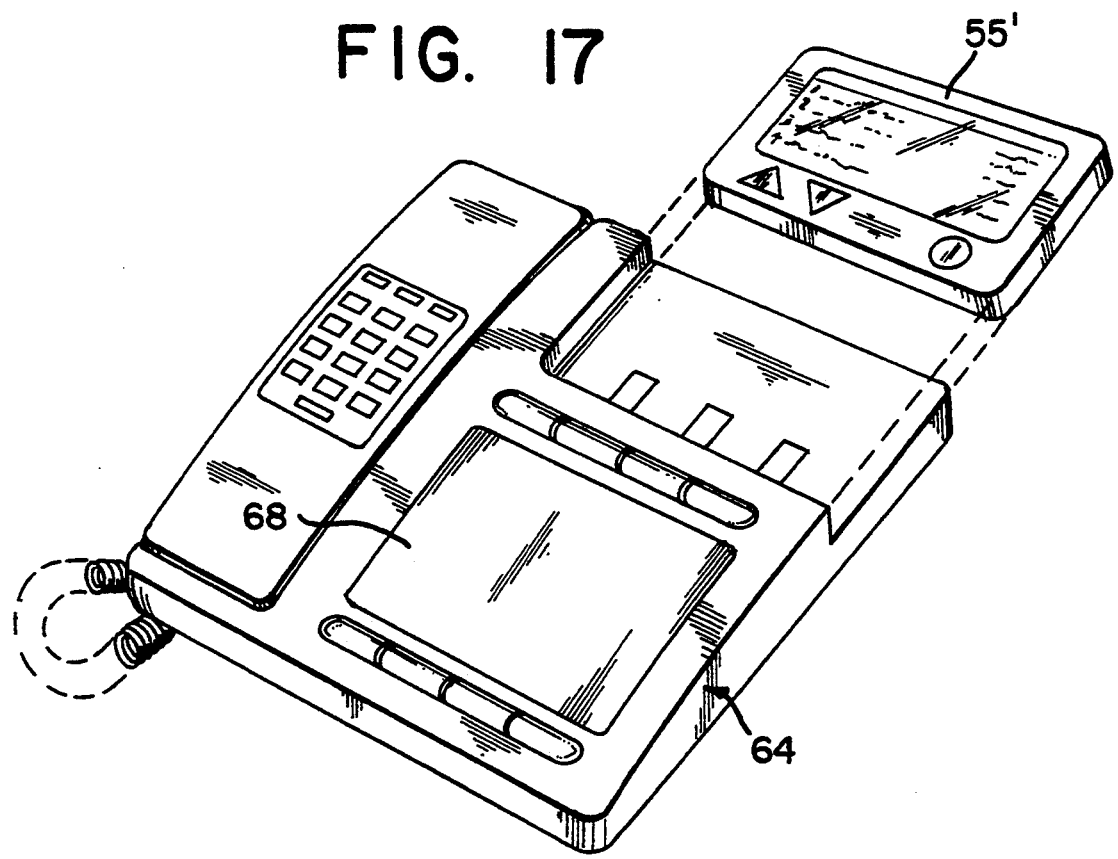
FIG. 17 is a perspective view of a modified telephone answering device with the remote access device detached.

In an alternate embodiment, the RAD 55' could be a detachable part of a modified base TAD 64 as shown in FIGS. 16 and 17. When mounted in the TAD 64, the RAD 55' is electrically connected to the TAD 64 and serves as the display and database for the TAD 64. When the RAD 55' is removed for mobile use as shown in FIG. 17, the modified base TAD 64 is only left with components sufficient to allow it to pick up the phone, play the OGM, record voice messages, decode and store DTMF signals, and link the DTMF signals to the voice messages. Through the linking codes in the RAD, the link between the caller's identity and the voice messages could be entirely within the RAD, such as if the linking code corresponded to the stored voice message number. Additionally, the modified TAD 64 has programming to allow it to interface with the RAD 55 or 55' as described above. Communication between a RAD and the modified TAD 64 would be identical to communication with a full-feature TAD. However, this modified base TAD 64 has no display once the RAD 55' is removed, nor a duplicate database to that stored in the RAD, and thus could not function identically to the preferred stand-alone TAD. This combination of a modified TAD and RAD would be a less expensive alternative to a full-function TAD and a separate RAD. The modified TAD 64 preferably includes other keys for inputting database information, etc., although these are shown covered with cover 68.

Figure 18:
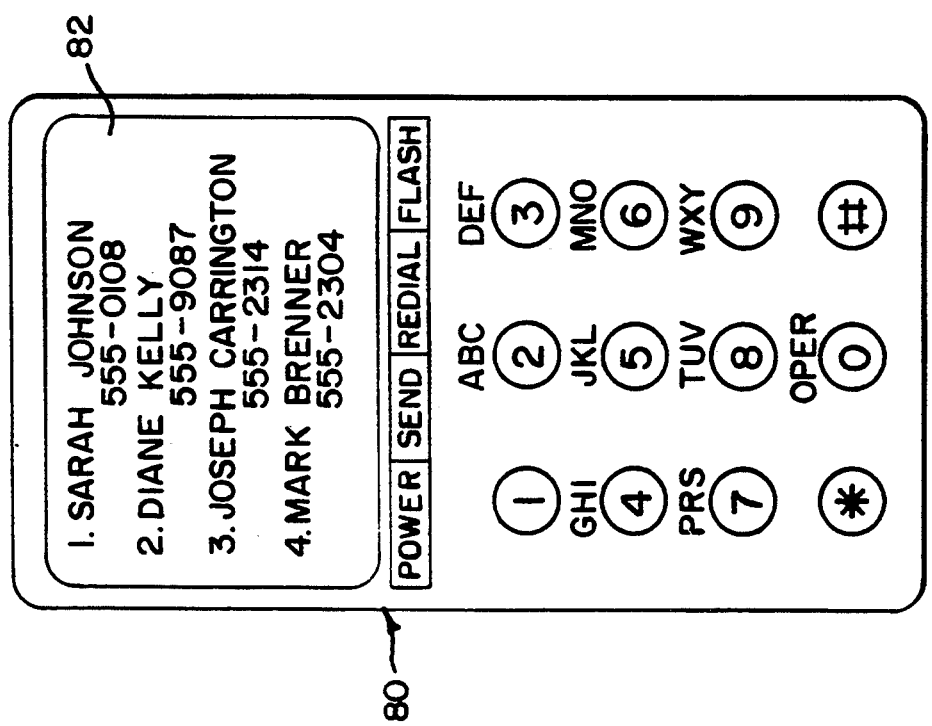

In FIG. 18, a modified mobile telephone 80, such as a cellular phone, is shown, which has a RAID incorporated within. The RAD functions as mentioned above, except the connection between the RAD and the remote telephone (now the cellular phone) is electrical and the selection buttons may be shared between them. Additionally, the telephone is constructed with a larger display 82 than is conventional to allow for the display of caller identities. In this construction, the voice message transmitted by the base unit may be heard over the cellular telephone simultaneously with display of the additional information for the caller in question. Additionally, the mobile telephone could be programmed such that, through actuation of a single function key, the telephone would call the base TAD, establish a telephone connection, and automatically interact with the base TAD to retrieve the callers' identities for the stored messages.

Figure 19:
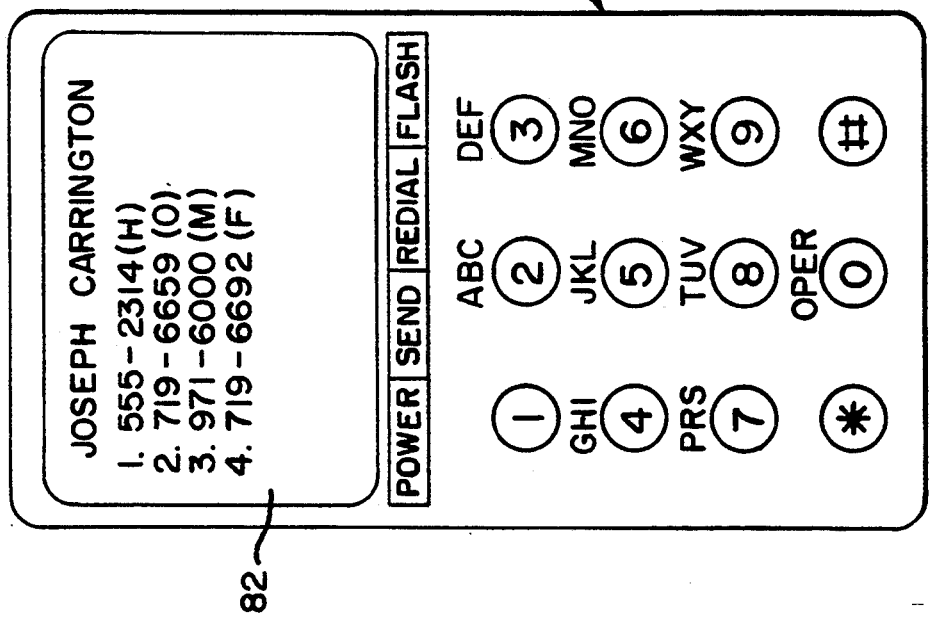
FIGS. 18-19 are front views of a mobile telephone including a remote access device according to the invention.

As seen in FIG. 19, the display 82 may also be used to display additional information for a selected caller. Then, through selection of a displayed phone number, the cellular telephone automatically dials the number and provides a telephone connection.

Of course, several RADs could be used to access a single TAD, although preferably not simultaneously.

While the embodiments shown and described are fully capable of achieving the objects of the invention, it is to be understood that these embodiments are shown only for the purpose of illustration and not for the purpose of limitation.

What is claimed is

1. A telephone message system for use with a telephone line for automatically storing and later retrieving information from incoming telephone calls, comprising:
   (a) a telephone answering device coupled to a telephone line, which comprises:
   means for receiving and storing first signals from said telephone line, each of said first signals specifying a caller;
   means for receiving and storing a voice message from each caller on said telephone line;
   means for converting each received first signal into received identifying information;
   means for linking each received identifying information with the corresponding stored voice message;
   means for transmitting said received identifying information to a user of said telephone message system for assisting in the selective retrieval of at least one of said stored messages; and
   (b) a remote access device, which comprises:
   means for storing a predetermined list of names and associated stored identifying information;
   means for receiving from said telephone answering device the received identifying information specifying the identities of the callers;
   means for comparing the received identifying information with said predetermined list of stored identifying information;
   means for displaying one or more respective caller names if the comparing means matches one or more received identifying information with any stored identifying information in said list.

2. A telephone message system as in claim 1, wherein said telephone answering device and said remote access device are in close proximity to one another and communicate through a disengageable electrical connection.

3. A telephone message system as in claim 1, wherein said telephone answering device and said remote access device are physically separated from one another and are adapted to communicate through a telephone line.

4. A telephone message system as in claim 1, wherein said means for displaying also displays a linking code for each caller's identifying information corresponding to the stored voice message in said telephone answering device, whereby said linking codes may be selectively transmitted by the user of the remote access device to said telephone answering device to cause said telephone answering device to replay the corresponding voice message.

5. A telephone message system as in claim 1, further comprising disengageable electrical connecting means for selectively coupling and uncoupling said telephone answering device and said remote access device to one another.

6. A remote access device for retrieving at least one recorded voice message left by at least one caller on a base telephone answering machine, comprising:
   means for storing a predetermined list of names and associated stored identifying information;
   means for transferring information between said remote access device and said base telephone answering machine;
   means for receiving signals from the base answering machine identifying said at least one caller;
   means for converting signals received by said means for receiving into received identifying information;
   means for comparing the received identifying information with said predetermined list of stored identifying information;
   means for displaying at least one respective caller name of said at least one caller if the comparing means matches the received identifying information with any stored identifying information in said list, said means for displaying also identifying to a user of said remote access device a linking code for each caller name of said at least one caller corresponding to the recorded voice message in the telephone answering machine, whereby the user will have access to said linking code for each name corresponding to a respective recorded voice message, which then may be selectively transmitted to said base telephone answering machine to cause said machine to replay the corresponding voice message.

7. A remote access device as in claim 6, wherein said means for displaying is also adapted to display associated stored identifying information for at least one of said at least one caller from said predetermined list of names and associated stored identifying information.

8. A remote access device as in claim 7, further comprising a DTMF tone generator for producing DTMF tones corresponding to a portion of said associated stored identifying information.

9. A remote access device as in claim 6, further comprising a DTMF tone generator for transmitting to said telephone answering machine the DTMF tone sequence corresponding to the linking code for a displayed caller's name.

10. A portable remote access device communicating with a telephone answering machine for assisting in the selective retrieval of a plurality of stored voice messages from at least one caller on said telephone answering machine, each of said caller messages being recorded by said answering machine, comprising:
   means for storing a predetermined list of names and associated stored identifying information;
   means for receiving a signal from said telephone answering machine, said signal being transmitted by said telephone answering machine after at least one voice message is stored by said telephone answering machine, said signal being indicative of the identity of the at least one caller of said plurality of stored messages, said signal also conveying a linking code linking each caller's identity with the corresponding voice message stored in said telephone answering machine;

means for comparing said signal with said predetermined list of stored identifying information;

means for simultaneously displaying the respective caller identity corresponding to each of said plurality of stored messages if the comparing means matches said signal with any stored identifying information in said predetermined list; and means for identifying the linking code corresponding with each caller's identity, whereby a user will have access to the linking code which corresponds to a particular caller's identity and which, when said linking code is transmitted to said telephone answering machine over a single communication channel, will cause said machine to play back the corresponding voice message over said single communication channel.

11. A mobile phone communicating over a single communication channel for assisting in the selective retrieval of stored voice messages on a telephone answering machine, each of said messages being vocalized by a caller, comprising:

means for receiving first signals transmitted from said telephone answering machine over said single communication channel, after a voice message has been stored by said telephone answering machine, said first signals identifying the callers who vocalized said stored messages;

means for simultaneously displaying a plurality of identities of said callers who vocalized said stored messages;

selection means associated with said displaying means for allowing selection from among the plurality of identities being displayed; and means for controlling said telephone answering machine, said means for controlling being operatively connected with said selection means for transmitting a second signal over a single communication channel to cause said machine to play back a selected stored message over said single communication channel in response to the selection on said selection means of a displayed identity.

12. A remote access device communicating over a telephone line for automatically retrieving information identifying the callers of stored voice messages on a telephone answering machine, comprising:

a microcomputer having a read only memory (ROM) for providing a program for said microcomputer, and a random access memory (RAM) with a plurality of storage sections therein;

a keyboard means having a plurality of alphanumeric and function keys coupled to said microcomputer;

an alphanumeric display means mounted on said device and coupled to said microcomputer;

said RAM being adapted to have a predetermined list of names and associated identifying information stored therein in a first memory section thereof;

an analog telephone interface means for coupling said telephone line and said microcomputer for communicating over said line with said telephone answering machine;

a telephone signal converter means coupled between said telephone line and said microcomputer for converting telephone numbers transmitted from said telephone answering machine over the telephone line into digital form understandable by said microcomputer;

said microcomputer comparing converted incoming telephone numbers with said list of associated identifying information stored in said first memory section of said RAM;

means for indicating a corresponding caller name for each of said incoming telephone numbers when the transmitted telephone number corresponds to a telephone number previously stored in said first memory section;

means for displaying a linking code for each caller's name corresponding to its associated voice message stored in said telephone answering machine, whereby a user may transmit a linking code for a particular caller's name to said telephone answering machine and cause said machine to replay the corresponding voice message.

13. In a mobile telephone having receiving means and transmission means capable of establishing telephone communication, a remote access device within said mobile telephone for retrieving at least one recorded voice message left by at least one caller on a base telephone answering machine, said remote access device comprising:

means for storing a predetermined list of names and associated stored identifying information;

means for receiving signals from the base answering machine specifying the identity of said at least one caller after said at least one caller has recorded a voice message in the base telephone answering machine;

means for converting said received signals into received identifying information;

means for comparing the received identifying information with said predetermined list;

means for displaying the respective caller's name if the comparing means matches the received identifying information with any stored identifying information in said list, said means for displaying also displaying a linking code for each caller's name corresponding to the recorded voice message in the telephone answering machine, whereby a user will have access to said linking code, which then may be selectively transmitted through said mobile telephone to said telephone answering machine to cause said machine to replay the corresponding voice message.

14. A telephone message system for use with a telephone line for automatically storing and later retrieving information from incoming telephone calls, comprising:

(a) a telephone answering device coupled to a telephone line, which comprises:

means for receiving and storing first signals from said telephone line, each of said first signals specifying a caller;

means for receiving and storing a voice message from each caller on said telephone line;

means for linking each of said first signals with the corresponding stored voice message;

means for transmitting said first signals to a user of said telephone message system for assisting in the selective retrieval of at least one of said stored voice message from each call; and (b) a remote access device, which comprises:

means for storing a predetermined list of names and associated stored identifying information;

means for receiving said first signals from said telephone answering device specifying the identities of the callers;

means for converting each received first signal into received identifying information;

means for comparing the received identifying information with said predetermined list of stored identifying information;

means for displaying one or more respective caller names if the comparing means matches one or more received identifying information with any stored identifying information in said list.

15. A remote access device as in claim 6, wherein the order in which the caller name of said at least one caller is displayed is indicative of the linking code for each message.

16. A remote access device as in claim 10, wherein said linking code is identified by the order in which the identity of the at least one caller is displayed.

* * * * *